June 29, 1943.  F. LUX  2,322,949
SPINDLE AND KNOB CONSTRUCTION
Filed May 22, 1941
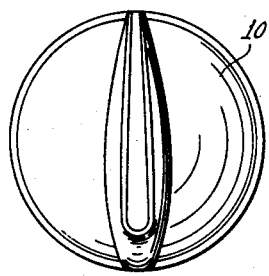
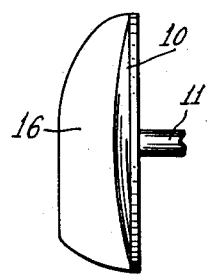
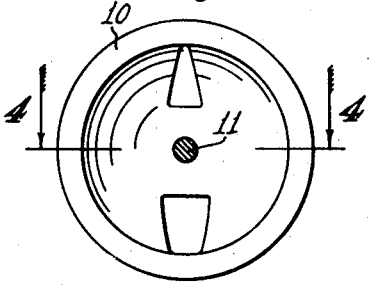
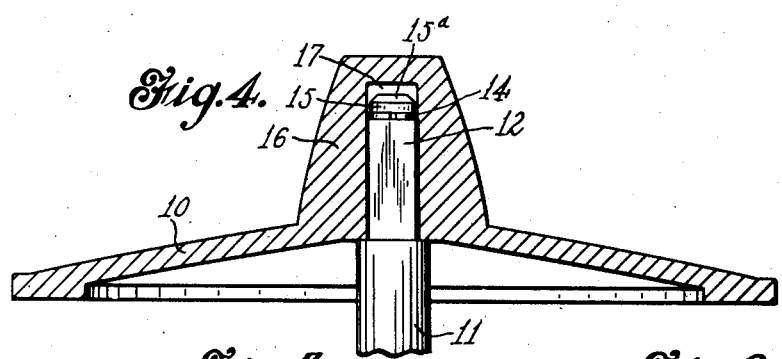
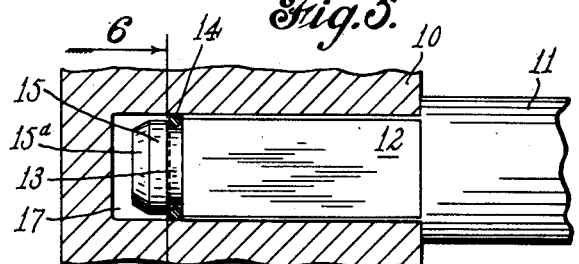
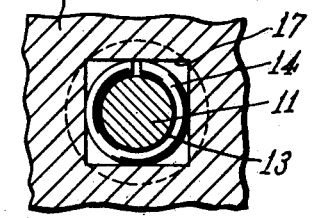
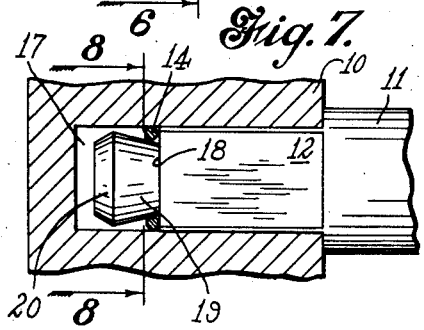
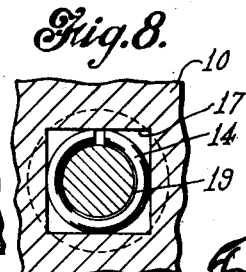
Inventor
Frederick Lux
By Rockwell & Batcheler
Attorneys Patented June 29, 1943

2,322,949

UNITED STATES PATENT OFFICE 2,322,949

SPINDLE AND KNOB CONSTRUCTION

Frederick Lux, Waterbury, Conn., assignor to The Lux Clock Mfg. Company, Inc., Waterbury, Conn., a corporation of Connecticut Application May 22, 1941, Serial No. 394,647

1 Claim. (Cl. 287—53)

This invention relates to spindle and knob constructions, and more particularly to a means for securing a knob upon a shaft such that the knob will be non-rotatably connected with the shaft and at the same time be frictionally secured thereon to prevent accidental detachment.

It has been the usual custom when a control knob is mounted upon a shaft to secure the same against removal therefrom by a set screw, but this means, aside from the expense involved, has certain disadvantages in that the set screw is apt to work loose, and is usually difficult of access with ordinary tools to tighten it. Moreover, if a construction could be devised, as in the present case, wherein the knob could merely be slipped upon the spindle by a longitudinal thrust, and thereafter automatically retained in place, the assembly of the parts would be rendered very simple, and would constitute a less expensive construction than those in use at the present time.

One object of the present invention is to provide a spindle and knob construction wherein the spindle may be placed upon the shaft by a longitudinal thrust and automatically secured thereon against accidental removal, as well as being secured to the shaft so that the latter may be rotated by the knob.

A still further object of the invention is to provide a shaft and knob provided with engaging portions whereby the two may be non-rotatably connected together, and at the same time secure the knob in place by frictional means so that accidental detachment of the knob from the shaft will be prevented.

More specifically the invention consists in the provision of a shaft having a non-circular portion received in a correspondingly shaped socket within the knob, the shaft being provided with a groove within which is disposed a split ring, so that the inherent resilience of the ring will tend to expand it against the walls of the opening or socket in the knob and hold the parts frictionally against detachment. At the same time it will be understood that the knob may be slipped in place upon the shaft merely by a longitudinal thrust, and be automatically retained thereon.

Still more specifically, the portion of the shaft upon which the ring is mounted may be so shaped as to cause a wedging action when an attempt is made to remove the knob from the shaft, so that the knob will be secured thereon against removal by ordinary means.

To these and other ends the invention consists in the novel features and combinations of parts to be hereinafter described and claimed.

In the drawing:

Fig. 1 is a front elevational view of a knob and shaft construction embodying my improvements;

Fig. 2 is a side elevational view of the same, a portion only of the spindle or shaft being shown;

Fig. 3 is a rear elevation of the parts shown in Figs. 1 and 2;

Fig. 4 is a sectional view on line 4—4 of Fig. 3;

Fig. 5 is an enlarged sectional view of the knob socket and shaft disposed therein;

Fig. 6 is a sectional view on line 6—6 of Fig. 5;

Fig. 7 is a sectional view similar to Fig. 5, showing a modified construction; and Fig. 8 is a sectional view on line 8—8 of Fig. 7.

To illustrate a preferred embodiment of my invention, I have shown a control knob or button 10 designed to be mounted upon a shaft 11 so that the latter may be turned by the knob. It is understood that the shaft may be employed in any desired relation, such as, for example, a timer wherein a timer-setting shaft is rotated by a knob mounted thereupon.

The body of the shaft 11 may be of any desired cross-sectional shape, it being shown as circular, which is the usual form. Adjacent the end of the shaft, however, there is provided a non-circular portion 12, herein shown as substantially square or provided with four flat sides. It will be understood that the particular shape of the portion 12 is not confined, however, to a square in cross-sectional form.

Adjacent the end of the portion 12 is provided an annular groove or recess 13 within which is mounted a split ring 14, which ring is also circular in cross-sectional form. Beyond the groove 13 the end of the shaft is provided with a slightly enlarged circular head 15, so that the ring 14 will be retained in place, and a tapered circular portion 15ª beyond the head. It will be understood that the ring 14 is of resilient material, so that, owing to its being of split construction, it may be slipped over the head 15 of the shaft and snapped into place in the groove 13, due to its own resiliency. Also it will be understood that when in the groove it will normally be slightly expanded, so that it may be further compressed and will offer resistance to such compression, or will tend to expand in contact with a surrounding surface.

The knob 10 as shown is provided with a central boss or thickened portion 16 within which is a non-circular socket or recess 17, preferably corresponding in shape to that of the portion 12 of the shaft, so that when this portion of the shaft is slipped within the socket 17, the parts will be non-rotatably secured together.

It will be understood that the knob 10 may be made of any suitable material such as a plastic, for example, and molded in the form shown, during which process the socket 17 will also be formed.

It will be obvious that, when the knob 10 is formed as shown, and the shaft 11 is prepared and the split ring 14 assembled in the groove 13, the knob may be slipped upon the end of the shaft, as shown in Figs. 4 and 6, with the non-circular portion 12 of the shaft received in the socket 17. It will be understood that the external diameter of the ring will normally be slightly larger than the dimensions of the socket 17, so that when the portion 12 of the shaft is slipped within the socket, this ring, due to its rounded form, will be slightly compressed within the groove 13, and will tend to expand by its inherent resiliency, so that its outer surface will be urged or pressed against the walls of the socket to frictionally engage the same, and prevent removal of the knob except by the use of considerable force. In other words, it may only be detached when this operation is definitely intended, and will not be detached accidentally. Also, due to the non-circular cross-sectional shapes of the end portion 12 of the shaft and the interior of the socket 17, the knob and shaft will be non-rotatably secured together so that the turning of the knob will rotate the shaft as is desired.

In Figs. 7 and 8 of the drawing I have shown a construction wherein, once the parts are assembled, their detachment by any ordinary means will be prevented. In this modification the shaft, except the extreme end thereof, and the knob itself are formed as already described in connection with Figs. 1 to 6, and bear corresponding reference characters. It will be noted, however, that at the extreme end of the shaft, instead of providing an annular groove, the shaft is reduced in cross-sectional area so as to provide a shoulder 18, and beyond this shoulder the surface of the shaft is tapered outwardly at 19 to provided a frusto-conical surface circular in cross-section, about which the split ring 14 extends. At the extreme end the shaft may be slightly tapered, as shown at 20, so as to facilitate the slipping of the ring thereon. With this construction it will be seen that the ring rests in a modified V-shaped groove defined by the shoulder 18 at one side and the frusto-conical surface 19 at the other.

The parts are assembled as previously described, and as shown in Fig. 7. It will be seen that when an attempt is made to draw the shaft from the socket 17, the ring 14, which frictionally engages the walls of the socket, will tend to ride up upon the inclined or frusto-conical surface 19, thus producing a wedging action and increasing the friction or grip between the outer surface of the ring and the inner walls of the socket, and thus preventing removal of the shaft from the knob. On the other hand, when the shaft is inserted within the recess 17, the insertion may be accomplished with the same facility as in that construction previously described, for in such case the tendency will be to force the ring against the shoulder 18, where it may be readily compressed to a sufficient extent to permit its insertion into the socket.

While I have shown and described some preferred embodiments of the invention, it will be understood that it is not to be limited to all of the details shown, but is capable of modification and variation within the spirit of the invention and within the scope of the appended claim.

What I claim is:

A spindle and knob construction comprising a rotatable shaft having a reduced end portion providing a shoulder between such portion and the body of the shaft, said portion having at least one flattened side so as to be non-circular in cross section, and said portion having a shoulder at its free end and an outwardly tapered portion beyond said shoulder forming a recess with said shoulder, a split ring disposed in said recess surrounding the tapered portion of the shaft, a knob member abutting the first-named shoulder on the shaft and having a non-circular socket receiving therein the reduced end portion of the shaft whereby the ring frictionally engages the wall of the socket, and said tapered end portion of the shaft exerting a wedging action to force the ring tightly against the socket wall when the parts are moved in the direction of separation.

FREDERICK LUX.